United States Patent
Endlich et al.

(10) Patent No.: US 12,441,225 B2
(45) Date of Patent: Oct. 14, 2025

(54) INTERCHANGEABLE INSERTS FOR VEHICLE PASSENGER COMPARTMENT COMPONENTS

(71) Applicant: GM Global Technology Operations LLC, Detroit, MI (US)

(72) Inventors: Ashley Nichole Endlich, Troy, MI (US); Charles J. Haubner, Ray Township, MI (US); Wayne M. Lucas, Bruce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 496 days.

(21) Appl. No.: 17/943,412

(22) Filed: Sep. 13, 2022

(65) Prior Publication Data

US 2024/0083325 A1 Mar. 14, 2024

(51) Int. Cl.
*B60N 3/10* (2006.01)

(52) U.S. Cl.
CPC .............. *B60N 3/108* (2013.01); *B60N 3/10* (2013.01); *B60N 3/101* (2013.01)

(58) Field of Classification Search
CPC . B60N 3/10; B60N 3/101; B60R 7/04; B60N 3/108
See application file for complete search history.

(56) References Cited

U.S. PATENT DOCUMENTS

| | | | | |
|---|---|---|---|---|
| 4,969,618 A * | 11/1990 | Thompson | ............. | A47G 7/025 248/346.11 |
| 5,560,578 A * | 10/1996 | Schenken | ............. | B60N 3/106 248/229.21 |
| 6,176,536 B1 * | 1/2001 | Miller | ............. | B60R 7/04 224/311 |
| 6,619,716 B1 * | 9/2003 | Sturt | ............. | B60R 7/04 224/311 |
| 8,485,680 B2 * | 7/2013 | Anderson | ............. | B60Q 3/64 362/101 |
| 10,173,589 B2 * | 1/2019 | Takahama | ............. | B60N 3/10 |
| 10,183,604 B2 * | 1/2019 | Krishnan | ............. | B60N 3/10 |
| 10,315,561 B2 * | 6/2019 | Porcs | ............. | B60Q 3/229 |
| 10,343,577 B1 * | 7/2019 | Medoro | ............. | B60N 3/108 |
| 10,493,922 B2 * | 12/2019 | Perez | ............. | B60N 3/103 |
| 11,505,106 B2 * | 11/2022 | Kotsuji | ............. | B60N 3/105 |

(Continued)

FOREIGN PATENT DOCUMENTS

| | | | | |
|---|---|---|---|---|
| DE | 102016110727 A1 * | 12/2017 | ............. | B60N 3/10 |
| WO | WO-2019074073 A1 * | 4/2019 | ............. | A47C 7/62 |

OTHER PUBLICATIONS

Machine Translation of DE102016110727A1 (Year: 2025).*
Machine Translation of WO2019074073A1 (Year: 2025).*

*Primary Examiner* — Jason S Morrow
(74) *Attorney, Agent, or Firm* — CANTOR COLBURN LLP

(57) ABSTRACT

A vehicle feature includes a wall having a wall surface formed from a first material and an opening extending through the wall surface. An insert is mounted to the wall surface. The insert is formed from a second material. The insert includes a wall member having a first side facing the wall surface and a second side facing away from the wall surface. The first side includes at least one connector element that engages with the wall surface through the opening. The insert is covered in a third material that is distinct from the first material and the second material.

20 Claims, 8 Drawing Sheets

(56) References Cited

U.S. PATENT DOCUMENTS

| | | | |
|---|---|---|---|
| 11,766,962 B2* | 9/2023 | Sakakibara | B60N 3/103 224/544 |
| 11,780,374 B2* | 10/2023 | Vite Cadena | B60R 11/02 224/544 |
| 2004/0217247 A1* | 11/2004 | Andrews | B60N 3/108 248/311.2 |
| 2015/0191116 A1* | 7/2015 | Forrest | B60Q 3/64 362/516 |
| 2018/0162251 A1* | 6/2018 | Bohlke | B60N 2/757 |
| 2020/0062160 A1* | 2/2020 | Stock | B60N 3/107 |
| 2025/0026274 A1* | 1/2025 | Moore | B60R 7/08 |
| 2025/0026275 A1* | 1/2025 | Moore | B60R 7/04 |

\* cited by examiner

INTERCHANGEABLE INSERTS FOR VEHICLE PASSENGER COMPARTMENT COMPONENTS

INTRODUCTION

The subject disclosure relates to the art of vehicles and, more particularly to interchangeable inserts for vehicle passenger compartment components.

Many vehicles include components or surfaces that are covered in a material that matches or compliments other interior trim. That is, flat and/or convex surfaces such as those found on dashboards, consoles, arm rests and the like may be covered in a material that matches or compliments the interior trim. In some cases, the surfaces may be covered in what may be designated as a premium material such as leather. Covering convex and/or exposed flat surfaces is relatively easy. The material is able to be maintained in tension and thus present a wrinkle-free appearance. Covering concave surfaces, as well as various interior, (e.g., compartment,) surfaces presents a number of challenges.

Covering a concave surface and/or an interior compartment surface is challenging. The material must be maintained in tension to avoid wrinkles, bunching, and other undesirable surface irregularities. Maintaining tension on a concave surface and/or an interior compartment surface is difficult at best. As such, concave surfaces, and interior compartment surfaces in a vehicle interior such as cup holders, grab handles, pull cups, coin bins, consoles, and the like are often not covered in a premium material or another material at all. The material used to form the surface remains exposed. The use of premium materials is desirable in various car models. Accordingly, it is desirable to provide a system that allows for covering concave and/or interior compartment surfaces with various types of material.

SUMMARY

A vehicle feature, in accordance with a non-limiting example, includes a wall having a wall surface formed from a first material and an opening extending through the wall surface. An insert is mounted to the wall surface. The insert is formed from a second material. The insert includes a wall member having a first side facing the wall surface and a second side facing away from the wall surface. The first side includes at least one connector element that engages with the wall surface through the opening. The insert is covered in a third material that is distinct from the first material and the second material.

In addition to one or more of the features described herein the insert includes a first insert extending along a first portion of the wall surface and a second insert extending along a second portion of the wall surface.

In addition to one or more of the features described herein the wall surface includes a concave curvilinear profile.

In addition to one or more of the features described herein the first insert includes a first curvature that extends along a first portion of the concave curvilinear profile and the second insert includes a second curvature that extends along a second portion of the concave curvilinear profile.

In addition to one or more of the features described herein the first curvature is substantially similar to the second curvature.

In addition to one or more of the features described herein a gripping member is disposed between the wall surface and the first side of the insert, the gripping member including one or more gripping features that project radially inwardly past the second side.

In addition to one or more of the features described herein the one or more gripping features define a living hinge that extends radially inwardly between the first insert and the second insert.

In addition to one or more of the features described herein the gripping member includes a plurality of first connectors that pass through and connect with the wall and the at least one connector element passes through the gripping member into the opening.

In addition to one or more of the features described herein the second side of the insert defines a portion of a cup holder.

In addition to one or more of the features described herein the third material is leather.

A vehicle, in accordance with a non-limiting example, includes a body, a passenger compartment arranged in the body and a vehicle feature arranged in the passenger compartment. The vehicle feature includes a wall having a wall surface formed from a first material and an opening extending through the wall surface. An insert is mounted to the wall surface. The insert is formed from a second material. The insert includes a wall member having a first side facing the wall surface and a second side facing away from the wall surface. The first side includes at least one connector element that engages with the wall surface through the opening. The insert is covered in a third material that is distinct from the first material and the second material.

In addition to one or more of the features described herein the insert includes a first insert extending along a first portion of the wall surface and a second insert extending along a second portion of the wall surface.

In addition to one or more of the features described herein the wall surface includes a concave curvilinear profile.

In addition to one or more of the features described herein the first insert includes a first curvature that extends along a first portion of the concave curvilinear profile and the second insert includes a second curvature that extends along a second portion of the concave curvilinear profile.

In addition to one or more of the features described herein the first curvature is substantially similar to the second curvature.

In addition to one or more of the features described herein a gripping member is disposed between the wall surface and the first side of the insert, the gripping member including one or more gripping features that project radially inwardly past the second side.

In addition to one or more of the features described herein the one or more gripping features define a living hinge that extends radially inwardly between the first insert and the second insert.

In addition to one or more of the features described herein the gripping member includes a plurality of first connectors that pass through and connect with the wall and the at least one connector element passes through the gripping member into the opening.

In addition to one or more of the features described herein the second side of the insert defines a portion of a cup holder.

In addition to one or more of the features described herein the third material is leather.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
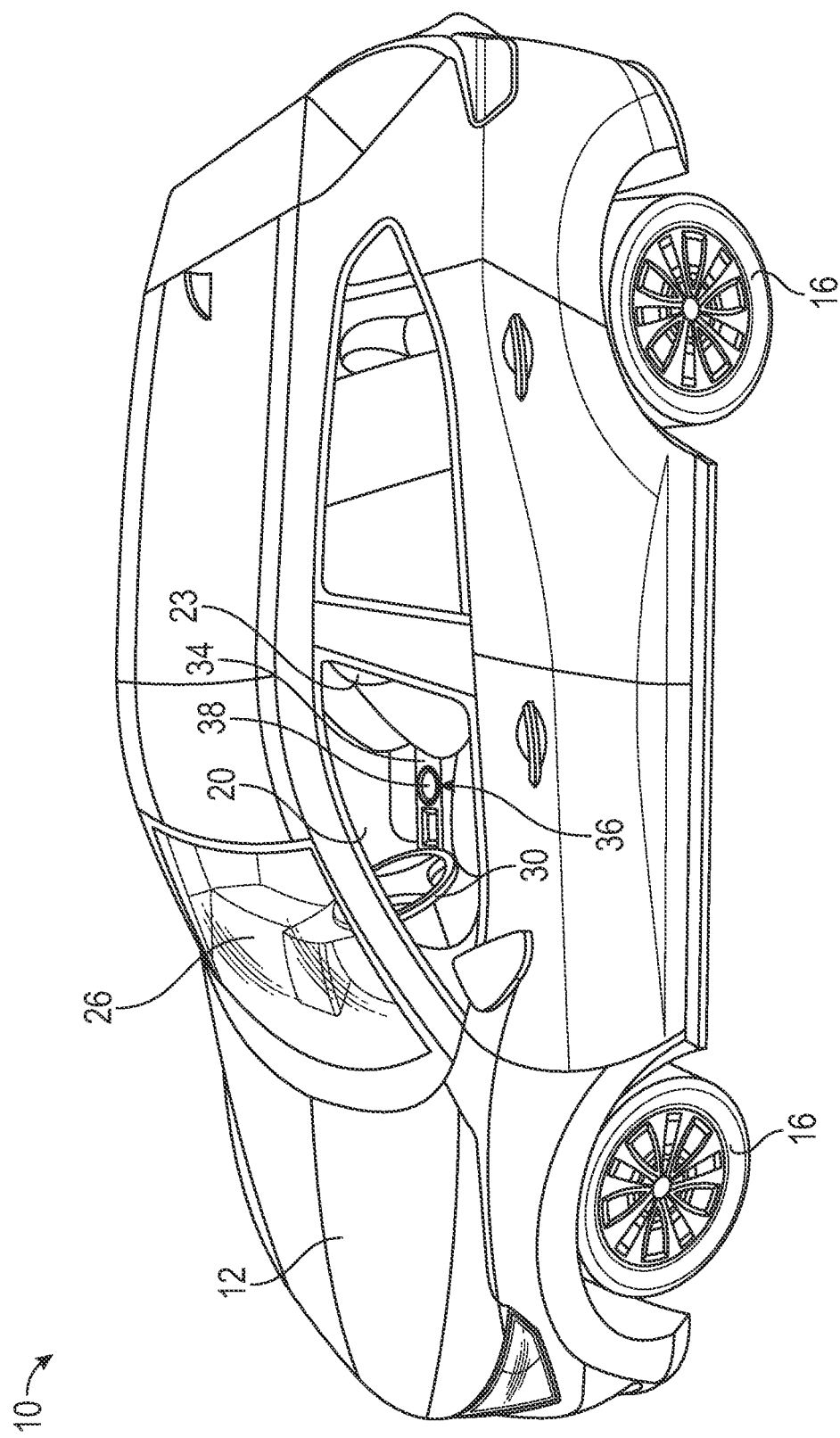
FIG. 1 depicts a vehicle including an interchangeable insert provided in a vehicle feature, in accordance with a non-limiting example

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. In the non-limiting example shown, two of the plurality of wheels 16 are steerable wheels. That is, changing a position of the two front wheels of the plurality of wheels 16 relative to body 12 will cause vehicle 10 to change direction. Body 12 defines, in part, a passenger compartment 20 having seats 23 positioned behind a dashboard 26. A steering control 30 is arranged between seats 23 and dashboard 26. Steering control 30 is operated to control orientation of the steerable wheels. A console 34 is arranged adjacent seat 23. Console 34 supports a vehicle feature 36 which, in a non-limiting example, takes the form of a cup holder 38. However, as will become more fully evident herein, vehicle feature 36 may take on a variety of forms.

Figure 2:
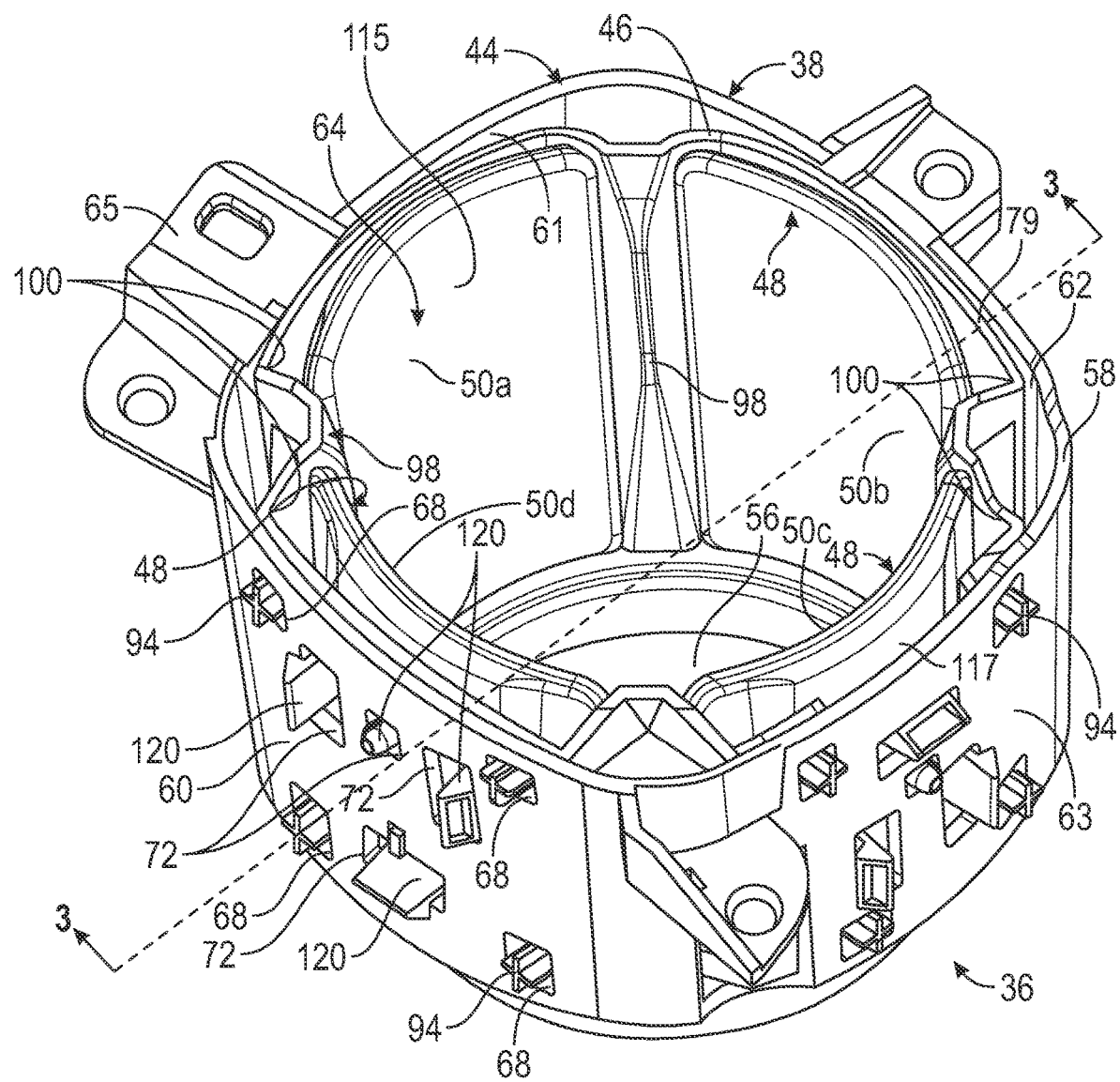
FIG. 2 depicts the vehicle feature shown as a cup holder including interchangeable inserts, in accordance with a non-limiting example.
Figure 3:
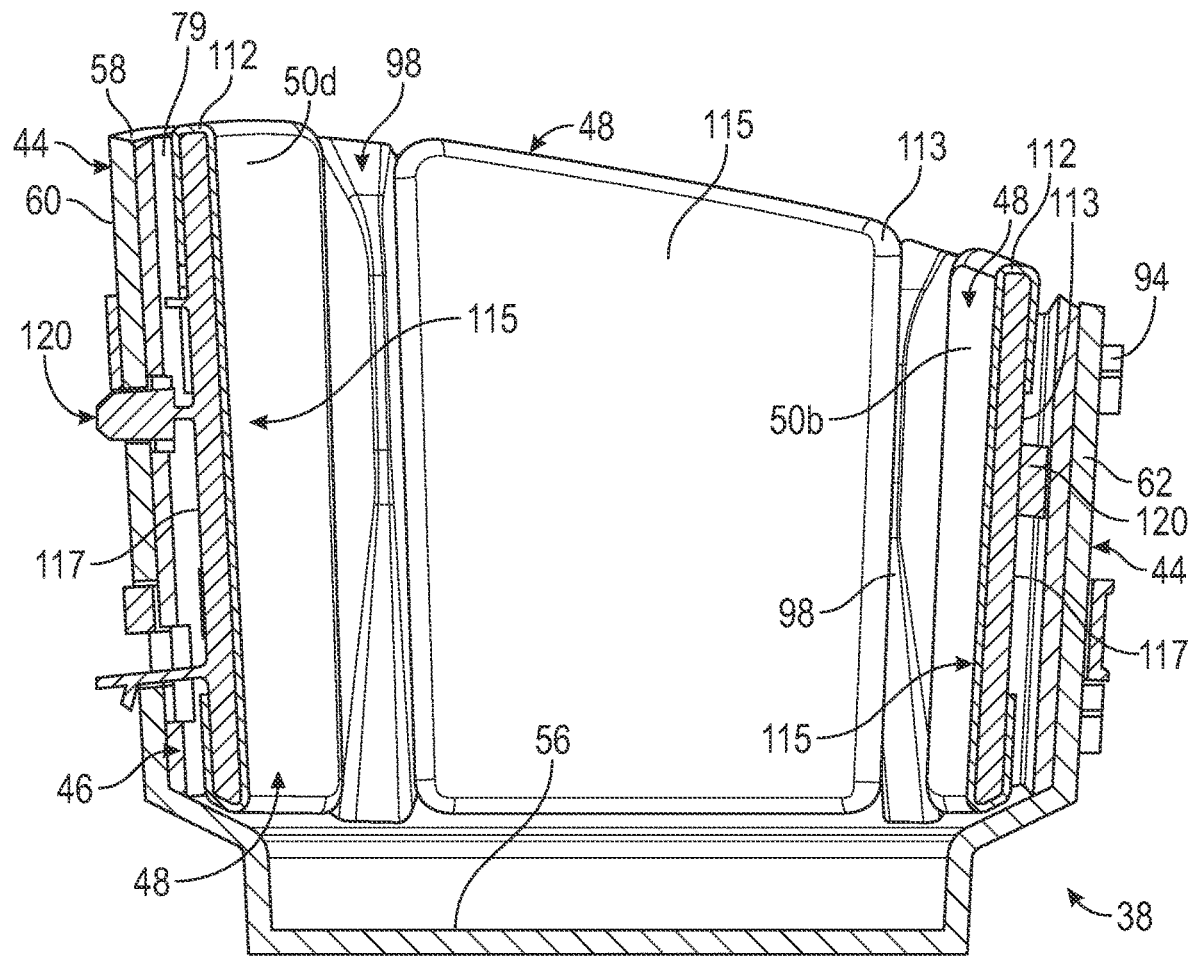
FIG. 3 is a cross-sectional side view of the cup holder of FIG. 2.

Referring to FIGS. 2 and 3, cup holder 38 includes a support member 44 that is receptive of a gripping member 46. As will be detailed herein, gripping member 46 exerts a radially inwardly directed force that is designed to retain a cup or other object placed in support member 44. In a non-limiting example, a plurality of inserts 48 are arranged about an interior of cup holder 38. Inserts 48 include a first insert 50a, a second insert 50b, a third insert 50c, and a fourth insert 50d. First insert 50a includes a first curvature, second insert 50b includes a second curvature, third insert 50c includes a third curvature, and fourth insert 50d includes a fourth curvature. Each of the first, second, third, and fourth curvatures are substantially similar.

Inserts 48 align with one another and adjacent surfaces to provide a substantially seamless decorative accent to cup holder 38. Inserts 48 may be covered by various materials including premium materials such as leather and carbon fiber, and non-premium materials such as vinyl and the like. Of course, it should be understood that the types of premium and non-premium material may vary and should not be considered to be limited to the examples discussed herein. In addition, inserts 48 may be readily interchangeable so as to update or accommodate changing user preferences or renew interior finishes of surfaces that may be worn.

Figure 4:
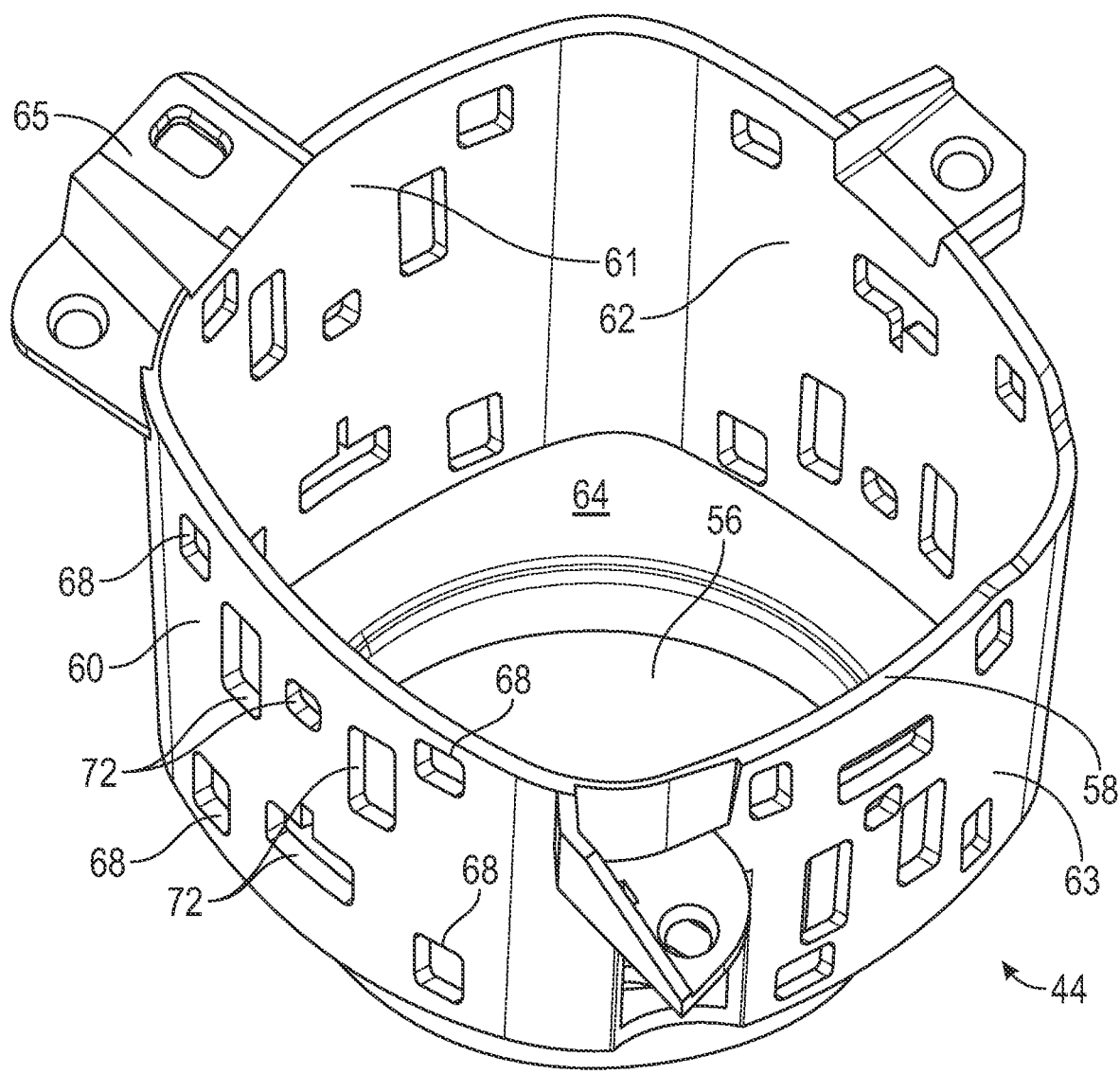
FIG. 4 is a perspective view of the cup holder without the interchangeable inserts, in accordance with a non-limiting example.

Referring to FIG. 4 and with continued reference to FIG. 2, support member 44 includes a base 56 and a wall 58. Wall 58 includes a plurality of wall surfaces that extend outwardly from base 56. Wall surfaces include a curvilinear profile. In the non-limiting example shown, wall 58 includes a first wall surface 60, a second wall surface 61, a third wall surface 62 and a fourth wall surface 63. First wall surface 60 defines a first side (not separately labeled) of cup holder 38, second wall surface 61 defines a second side (not separately labeled) of cup holder 38, third wall surface 62 defines a third side (not separately labeled) of cup holder 38, and fourth wall surface 63 defines a fourth side (not separately labeled) of cup holder 38. First, second, third, and fourth wall surfaces 60-63 collectively define a cup receiving zone 64 (FIG. 2).

A plurality of flanges, one of which is indicated at 65, projects outwardly from wall 58 of support member 44. The plurality of flanges 65 provides an attachment point for securing cup holder 38 in console 34. Support member 44 is also shown to include a first plurality of openings 68 and a second plurality of openings 72 arranged about each of the first, second, third, and fourth wall surfaces 60-63. For example, as shown on first wall surface 60, first plurality of openings 68 defines a first arrangement of openings (not separately labeled) and second plurality of openings 72 defines a second arrangement of openings (also not separately labeled). As will be detailed herein, first plurality of openings 68 provide an attachment point for gripping member 46 and second plurality of openings 72 provide an attachment point for each insert 48.

Figure 5:
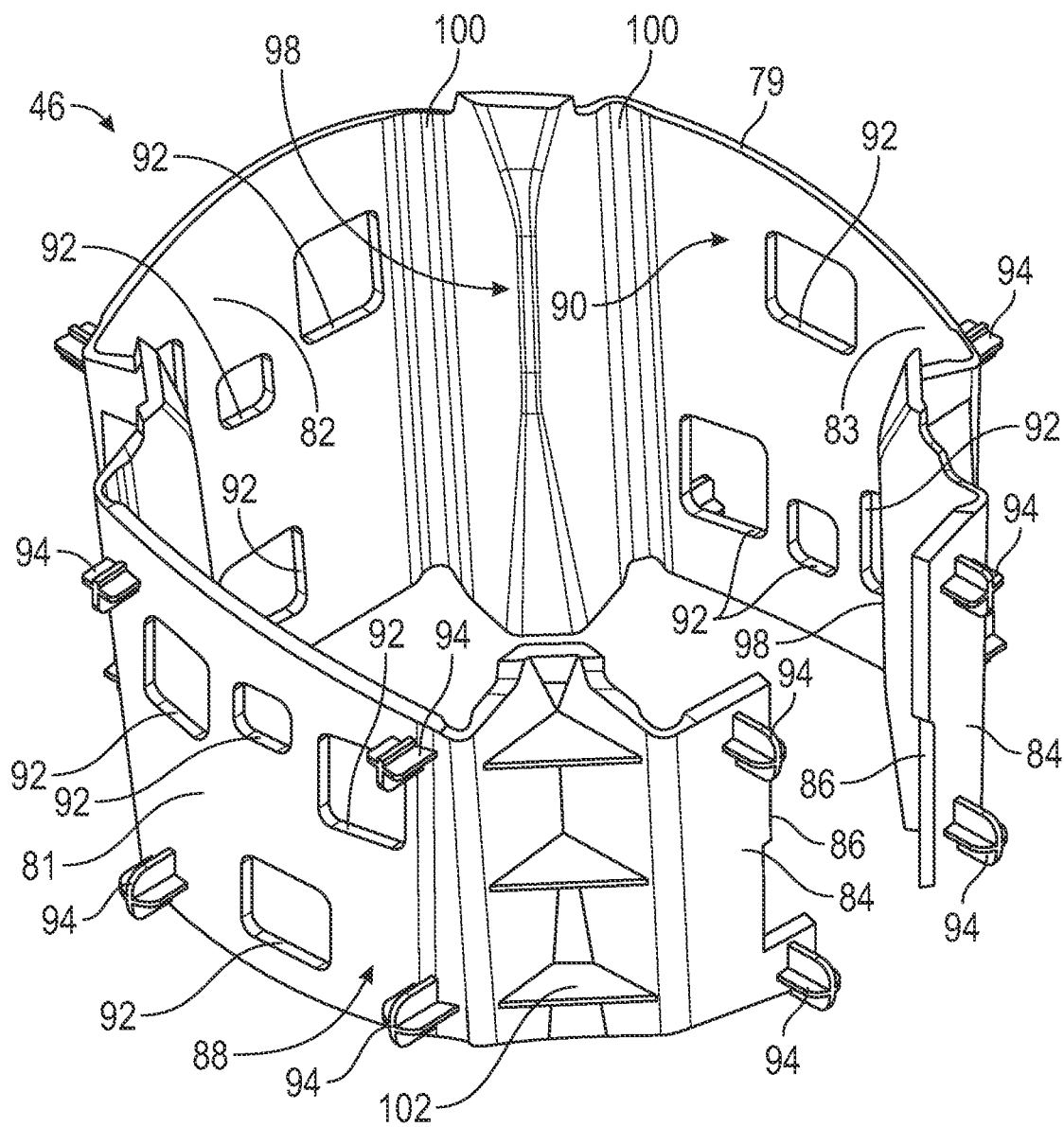
FIG. 5 is a perspective view of a gripping member of the cup holder of FIG. 2, in accordance with a non-limiting example.

Referring to FIG. 5 and with continued reference to FIG. 2, gripping member 46 includes a wall section 79 having a first wall surface section 81, a second wall surface section 82, a third wall surface section 83 and a fourth wall surface section 84. Fourth wall surface section 84 includes a discontinuity 86. Wall section 79 includes an outer surface 88 and an inner surface 90. A plurality of opening portions 92 extend through wall section 79 in each of the first, second, and third wall surface sections 81, 82, and 83. The plurality of opening portions 92 correspond to the second arrangement of openings 72 in support member 44.

Each of the first, second, third and fourth wall surface sections 81, 82, 83, and 84 include a plurality of posts 94 such as shown on first wall surface section 81. Plurality of posts 94 extend through the corresponding ones of first plurality of openings 68 (FIG. 4), on each of the first, second, third, and fourth wall surfaces 60-63. Posts 94 connect gripping member 46 with support member 44. In addition, gripping member 46 includes a plurality gripping features, one of which is indicated at 98. Each gripping feature 98 projects radially inwardly and defines a living hinge 100 formed by ribs 102. Gripping features 98 resiliently act upon and grip a cup or other similar structure resting in cup holder 38.

Figure 6:
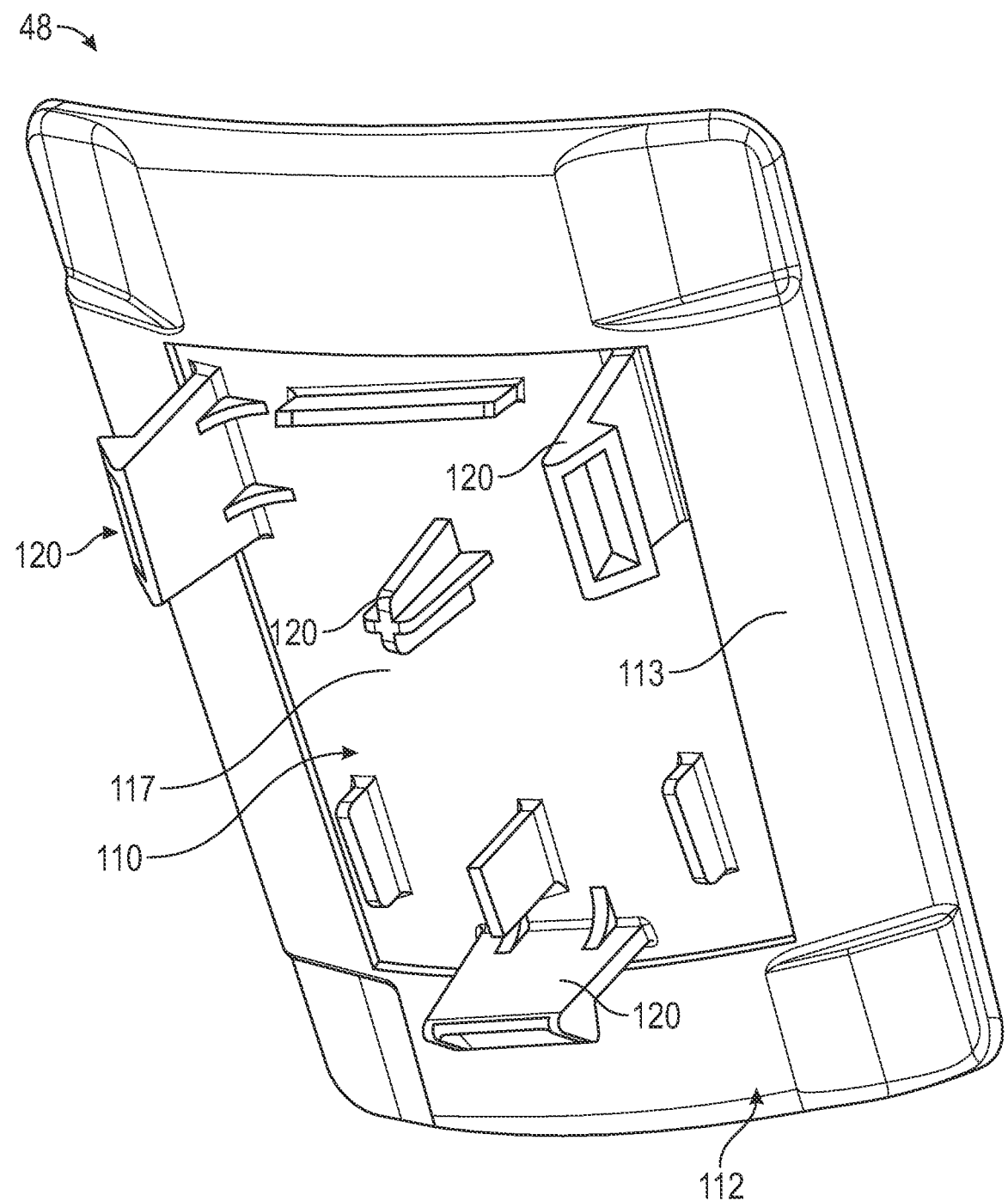
FIG. 6 is a rear view of an interchangeable insert, in accordance with a non-limiting example.

With reference to FIG. 6, each of the plurality of inserts 48 is formed from a base material 110 that is wrapped by a covering 112. In a non-limiting example, covering 112 is formed from a premium material and defines a leather covering 113. Of course, it should be understood that the particular form of covering 112 may vary and may include natural materials, engineered materials, synthetic materials, composite materials, and the like. Insert 48 includes a first side portion 115 (FIGS. 2/3) that is completely covered with covering 112 and a second side portion 117 that is only partially covered by covering 112. Second side portion 117 includes a plurality of connecting elements 120 that snap-fittingly connect to support member 44 through second plurality of openings 72. Insert 48 may be readily replaced to change out materials or otherwise adjust vehicle aesthetics. Each insert includes a curvature that matches a curvature of wall 58. Further, each insert 48 extends along a portion (not separately labeled) of wall 58.

Figure 7:
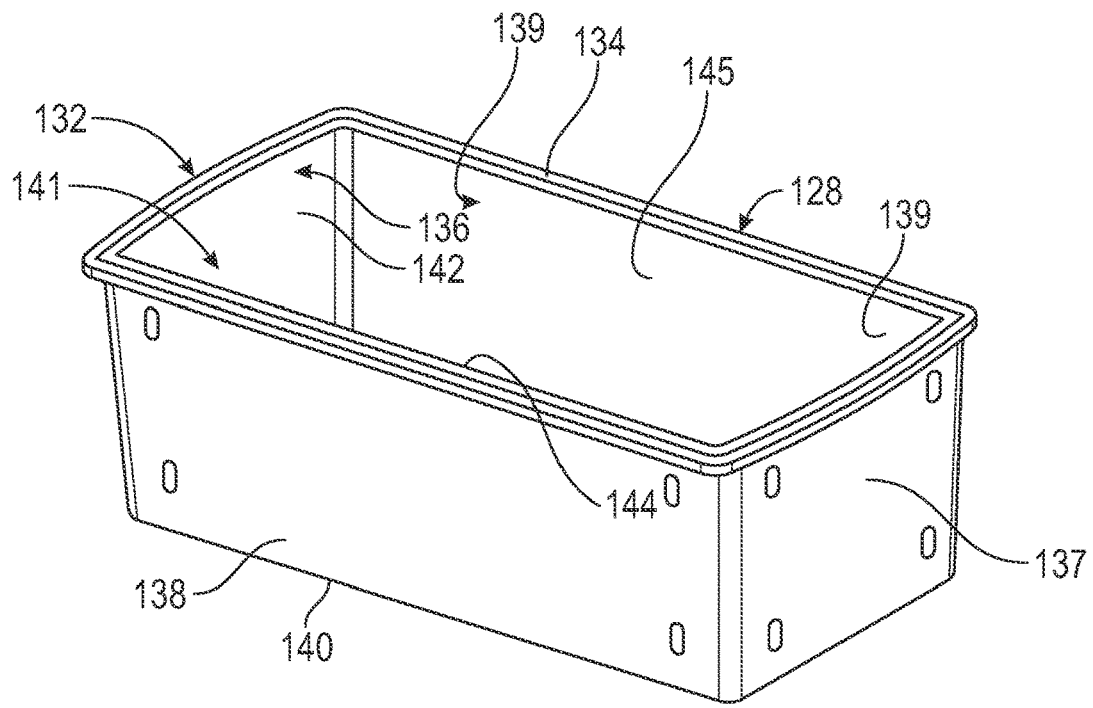
FIG. 7 is a perspective view of a vehicle feature shown as a bin including interchangeable inserts, in accordance with a non-limiting example.
Figure 8:
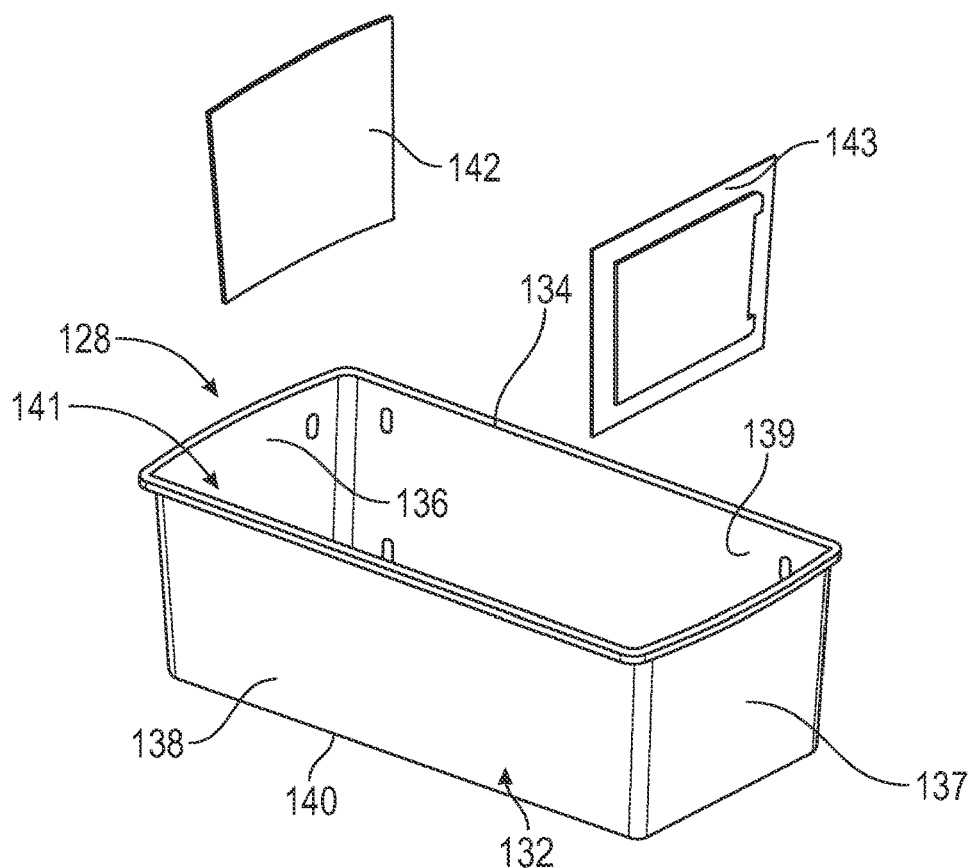
FIG. 8 depicts a first interchangeable insert and a second interchangeable insert being connected to the bin of FIG. 7.
Figure 9:
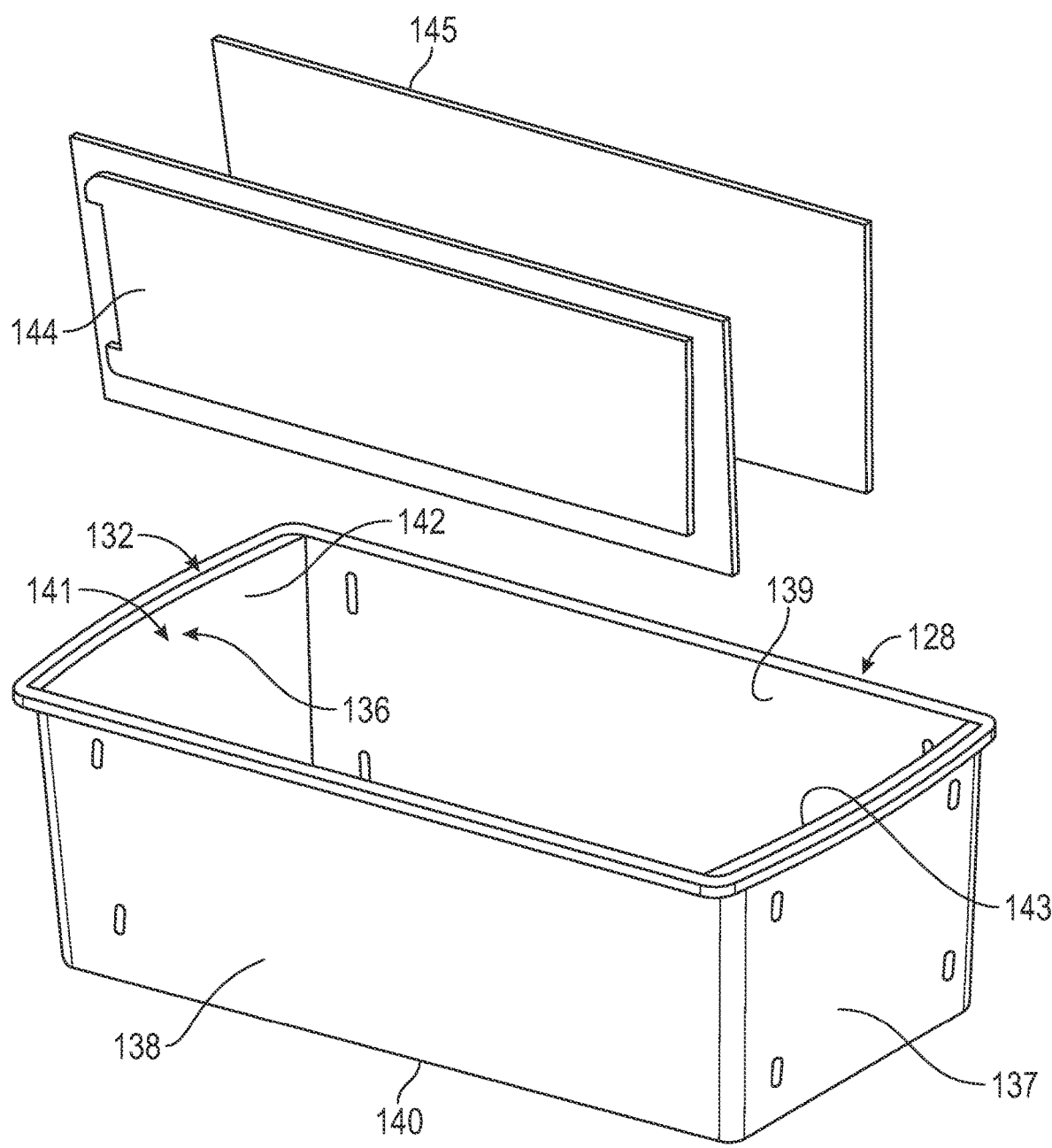
FIG. 9 depicts a third interchangeable insert and a fourth interchangeable insert being connected to the bin of FIG. 7.

Reference will now follow to FIGS. 7, 8, and 9 in describing a vehicle feature 128 in accordance with another non-limiting example. Vehicle feature 128 is shown in the form of a tray 132 that may rest in console 34 (FIG. 1). Of course, the particular location in vehicle 10 of tray 132 may vary. Tray 132 includes a wall 134 having a first wall surface 136, a second wall surface 137, a third wall surface 138, and a fourth wall surface 139. First, second, third, and fourth wall surfaces 136-139 together with a base 140 (not shown), define an article storage zone 141.

In accordance with a non-limiting example, tray 132 is provided with a plurality of aesthetic enhancements. For example, a first insert 142 is connected to first wall surface 136 and a second insert 143 is connected to second wall surface 137 opposite to first insert 142 as shown in FIG. 8. A third insert 144 is connected to third wall surface 138 and a fourth insert 145 is connected to fourth wall surface 139 such as shown in FIG. 9. In this manner, surfaces surrounding the base may be covered with an aesthetically pleasing material. For example, each insert may be covered in leather, or other natural materials, as well as synthetic materials, composite materials, and the like and sized such that adjacent edges abut one another and form a substantially seamless appearance. Further, given that the inserts may be removed and replaced, (i.e., are interchangeable) a consumer may tailor internal vehicle aesthetics to personal preferences which may, over time, change.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle feature comprising:
a wall having a wall surface formed from a first material and a first opening extending through the wall surface;
a gripping member mounted to the wall surface, the gripping member having a second opening and a plurality of gripping projections projecting away from the wall surface; and
an insert disposed between a first gripping projection and a second gripping projections of the plurality of gripping projections, the insert being formed from a second material,
wherein the insert includes a wall member having a first side facing towards the wall surface and a second side facing away from the wall surface,
wherein the first side includes at least one connector element that passes through the second opening of the gripping member and engages with the wall surface through the first opening, and
wherein the insert is covered in a third material that is distinct from the first material and the second material.

2. The vehicle feature according to claim 1,
wherein the insert is a first insert extending along a first portion of the wall surface, and
wherein the vehicle feature further comprises a second insert disposed between the second gripping projection and a third gripping projection of the plurality of projections and extending along a second portion of the wall surface.

3. The vehicle feature according to claim 2, wherein the wall surface includes a concave curvilinear profile.

4. The vehicle feature according to claim 3, wherein the first insert includes a first curvature that extends along a first portion of the concave curvilinear profile and the second insert includes a second curvature that extends along a second portion of the concave curvilinear profile.

5. The vehicle feature according to claim 4, wherein the first curvature is substantially similar to the second curvature.

6. The vehicle feature according to claim 1, wherein the first gripping projection and the second gripping projection project radially inwardly past the second side of the insert.

7. A vehicle feature comprising:
a wall having a wall surface formed from a first material and an opening extending through the wall surface;
an insert mounted to the wall surface, the insert being formed from a second material, the insert including a wall member having a first side facing the wall surface and a second side facing away from the wall surface, the first side including at least one connector element that engages with the wall surface through the opening, wherein the insert is covered in a third material that is distinct from the first material and the second material; and a gripping member disposed between the wall surface and the first side of the insert, the gripping member including one or more gripping features that project radially inwardly past the second side, wherein the insert includes a first insert extending along a first portion of the wall surface and a second insert extending along a second portion of the wall surface, and wherein the one or more gripping features define a living hinge that extends radially inwardly between the first insert and the second insert.

8. The vehicle feature according to claim 7, wherein the gripping member includes a plurality of first connectors that pass through and connect with the wall and the at least one connector element passes through the gripping member into the opening.

9. The vehicle feature according to claim 7, wherein the second side of the insert defines a portion of a cup holder.

10. The vehicle feature according to claim 1, wherein the third material is leather.

11. A vehicle comprising:
a body;
a passenger compartment arranged in the body; and
a vehicle feature arranged in the passenger compartment, the vehicle feature including
a wall having a wall surface formed from a first material and a first opening extending through the wall surface;
a gripping member mounted to the wall surface via an engagement structure extended through the first opening, the gripping member having a second opening and a plurality of gripping projections projecting away from the wall surface; and
an insert disposed between a first gripping projection and a second gripping projections of the plurality of gripping projections, the insert being formed from a second material,
wherein the insert includes a wall member having a first side facing towards the wall surface and a second side facing away from the wall surface,
wherein the first side includes at least one connector element that passes through the second opening of the gripping member and engages with the wall surface through the first opening, and
wherein the insert is covered in a third material that is distinct from the first material and the second material.

12. The vehicle according to claim 11,
wherein the insert is a first insert extending along a first portion of the wall surface, and
wherein the vehicle feature further includes a second insert disposed between the second gripping projection and a third griping projection of the plurality of projections and extending along a second portion of the wall surface.

13. The vehicle according to claim 12, wherein the wall surface includes a concave curvilinear profile.

14. The vehicle according to claim 13, wherein the first insert includes a first curvature that extends along a first portion of the concave curvilinear profile and the second insert includes a second curvature that extends along a second portion of the concave curvilinear profile.

15. The vehicle according to claim 14, wherein the first curvature is substantially similar to the second curvature.

16. The vehicle according to claim 11,
wherein the first gripping projection and the second gripping projection project radially inwardly past the second side of the insert.

17. The vehicle according to claim 11,
wherein the gripping member includes a plurality of living hinges, and
wherein the first gripping member is between two of the plurality of living hinges.

18. The vehicle according to claim 11, wherein the gripping member includes a plurality of first connectors that pass through and connect with the wall.

19. The vehicle according to claim 11, wherein the second side of the insert defines a portion of a cup holder.

20. The vehicle according to claim 11, wherein the third material is leather.

* * * * *